United States Patent
Young (10) Patent No.: US 10,611,462 B2
(45) Date of Patent: Apr. 7, 2020

(54) ACTUATOR ASSEMBLIES FOR CONTROL SURFACES OF AN AIRCRAFT, AIRCRAFT INCLUDING THE ACTUATOR ASSEMBLIES, AND METHODS OF UTILIZING THE SAME

(71) Applicant: The Boeing Company, Chicago, IL (US)

(72) Inventor: Stuart David Young, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 424 days.

(21) Appl. No.: 15/681,220

(22) Filed: Aug. 18, 2017

(65) Prior Publication Data

US 2019/0055005 A1 Feb. 21, 2019

(51) Int. Cl.
*B64C 13/30* (2006.01)
*F16H 25/22* (2006.01)
(Continued)

(52) U.S. Cl.
CPC ............ *B64C 13/30* (2013.01); *B64C 9/16* (2013.01); *B64C 13/24* (2013.01); *B64C 13/28* (2013.01); *F16H 25/22* (2013.01); *B64C 9/02* (2013.01)

(58) Field of Classification Search
CPC .. B64C 9/02; B64C 9/16; B64C 13/24; B64C 13/28; B64C 13/30
See application file for complete search history.

(56) References Cited

U.S. PATENT DOCUMENTS 2,959,066 A 11/1960 Bailey et al.
4,995,575 A * 2/1991 Stephenson ............... B64C 9/16
244/216

(Continued)

FOREIGN PATENT DOCUMENTS

DE 4009549 9/1991
EP 2433863 3/2012
JP H08211173 8/1996

OTHER PUBLICATIONS

Machine-generated English translation of the abstract of DE4009549, downloaded from Espacenet.com on Dec. 31, 2018.
(Continued)

*Primary Examiner* — Philip J Bonzell
*Assistant Examiner* — Michael B. Kreiner
(74) *Attorney, Agent, or Firm* — Dascenzo Intellectual Property Law, P.C.

(57) ABSTRACT

Actuator assemblies and methods of utilizing the same are disclosed herein. The actuator assemblies include a base structure and an actuated arm that are pivotally coupled to the base structure. The actuator assemblies also include a drive assembly that is operatively attached to the base structure and includes an output shaft. The actuator assemblies further include a linear actuator that includes an actuator shaft and an actuated body. The actuator shaft is coupled to and configured to rotate with the output shaft about an actuator shaft axis of rotation. The actuator assemblies also include a linkage that is pivotally coupled to the actuated arm. In addition, the linkage is operatively attached to the actuated body via a joint. The joint defines a plurality of joint axes of rotation that are spaced apart from the actuator shaft axis of rotation of the actuator shaft.

20 Claims, 8 Drawing Sheets

(51) Int. Cl.
*B64C 9/16* (2006.01)
*B64C 13/28* (2006.01)
*B64C 13/24* (2006.01)
*B64C 9/02* (2006.01)

(56) References Cited

U.S. PATENT DOCUMENTS

| | | | | | |
|---|---|---|---|---|---|
| 5,163,534 | A * | 11/1992 | Hillman | | B64C 9/00 |
| | | | | | 184/27.1 |
| 7,190,096 | B2 * | 3/2007 | Blanding | | B64C 13/00 |
| | | | | | 310/112 |
| 7,834,494 | B2 * | 11/2010 | Blanding | | B64C 13/00 |
| | | | | | 310/112 |
| 7,883,059 | B2 * | 2/2011 | Kunz | | B64C 13/24 |
| | | | | | 244/178 |
| 8,033,500 | B1 * | 10/2011 | Charafeddine | | B64C 13/28 |
| | | | | | 244/75.1 |
| 8,104,721 | B2 * | 1/2012 | Pohl | | B64C 9/16 |
| | | | | | 244/213 |
| 8,191,824 | B2 * | 6/2012 | Shaheen | | B64C 13/24 |
| | | | | | 244/75.1 |
| 9,963,220 | B2 * | 5/2018 | Ishihara | | B64C 9/16 |
| 10,234,012 | B1 * | 3/2019 | Latif | | B64C 13/50 |
| 10,443,696 | B1 * | 10/2019 | Latif | | B64C 5/10 |
| 2018/0194454 | A1 * | 7/2018 | Olson | | B64C 13/28 |
| 2019/0055002 | A1 * | 2/2019 | Bekircan | | B64C 3/38 |
| 2019/0101197 | A1 * | 4/2019 | Gavriliuc | | F16H 25/2228 |

OTHER PUBLICATIONS

Machine-generated English translation of the abstract of JPH08211173, provided with European Search Report for related European Application No. 18178047, dated Dec. 4, 2018.

European Patent Office, European Search Report for related European Application No. 18178047, dated Dec. 4, 2018.

Printout of Thomson Linear Slides product information on linear slides, downloaded from ThomsonLinear.com website on Aug. 18, 2017.

Hagen et al., "The X-38 V-201 Flap Actuator Mechanism," Proceedings of the 37$^{th}$ Aerospace Mechanisms Symposium, Johnson Space Center, May 19-21, 2004.

* cited by examiner

ACTUATOR ASSEMBLIES FOR CONTROL SURFACES OF AN AIRCRAFT, AIRCRAFT INCLUDING THE ACTUATOR ASSEMBLIES, AND METHODS OF UTILIZING THE SAME

FIELD

The present disclosure relates generally to actuator assemblies for control surfaces of aircraft, to aircraft including the actuator assemblies, and/or to methods of utilizing the actuator assemblies.

BACKGROUND

Actuator assemblies often are utilized in aircraft to facilitate, or provide a motive force for, motion of one or more components of the aircraft relative to a remainder of the aircraft. As examples, actuator assemblies may be utilized to actuate, or move, control surfaces and/or landing gear of the aircraft.

Historically, actuator assemblies for control surfaces have utilized linear actuators, such as lead screw and nut assemblies, coupled to drive assemblies, such as motors and/or transmissions, to provide the motive force for the motion. However, it often may be desirable to move control surfaces in a nonlinear fashion. As such, historical actuator assemblies have coupled one end of the lead screw to the drive assembly with a universal joint, or U-joint, and permitted the other end of the lead screw to float in space as the control surface is moved. Such historical actuator assemblies also have coupled the nut to the control surface via a gimbal joint.

Such a system, while effective, is heavy, relatively complicated, and provides a large number of degrees of freedom for relative motion among the linear actuator, the drive assembly, the control surface, and a remainder of the aircraft. Thus, there exists a need for improved actuator assemblies and methods of utilizing the same.

SUMMARY

Actuator assemblies and methods of utilizing the same are disclosed herein. The actuator assemblies are configured to move a control surface of an aircraft through a control surface range-of-motion. The actuator assemblies include a base structure and an actuated arm that is pivotally coupled to the base structure via a base mount. The actuated arm also includes a surface mount, which is configured to be pivotally coupled to the control surface, and a linkage mount. The actuator assemblies also include a drive assembly that is operatively attached to the base structure and includes an output shaft.

The actuator assemblies further include a linear actuator. The linear actuator includes an actuator shaft and an actuated body. The actuator shaft is coupled to, and configured to rotate with, the output shaft of the drive assembly about an actuator shaft axis of rotation. The actuated body is coupled to the actuator shaft and includes a joint mount. The actuator shaft and the actuated body are configured such that the actuated body operatively translates linearly along a length of the actuator shaft responsive to rotation of the actuator shaft about the actuator shaft axis of rotation.

The actuator assemblies also include a joint that is operatively attached to the joint mount. The joint defines a plurality of joint axes of rotation. The plurality of joint axes of rotation is spaced apart from the actuator shaft axis of rotation.

The actuator assemblies further also include a linkage that includes a body mount and an arm mount. The body mount is operatively attached to the actuated body via the joint. The arm mount is pivotally coupled to the linkage mount of the actuated arm. The actuator assembly is configured such that operative translation of the actuated body along the length of the actuator shaft pivots the actuated arm relative to the base structure about the base mount to move the control surface through the control surface range-of-motion.

DESCRIPTION

FIGS. 1-14 provide illustrative, non-exclusive examples of actuator assemblies 100 and/or aircraft 10, of components thereof, and/or methods 300, according to the present disclosure. Elements that serve a similar, or at least substantially similar, purpose are labeled with like numbers in each of FIGS. 1-14, and these elements may not be discussed in detail herein with reference to each of FIGS. 1-14. Similarly, all elements may not be labeled in each of FIGS. 1-14, but reference numerals associated therewith may be utilized herein for consistency. Elements, components, and/or features that are discussed herein with reference to one or more of FIGS. 1-14 may be included in and/or utilized with any of FIGS. 1-14 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 1:
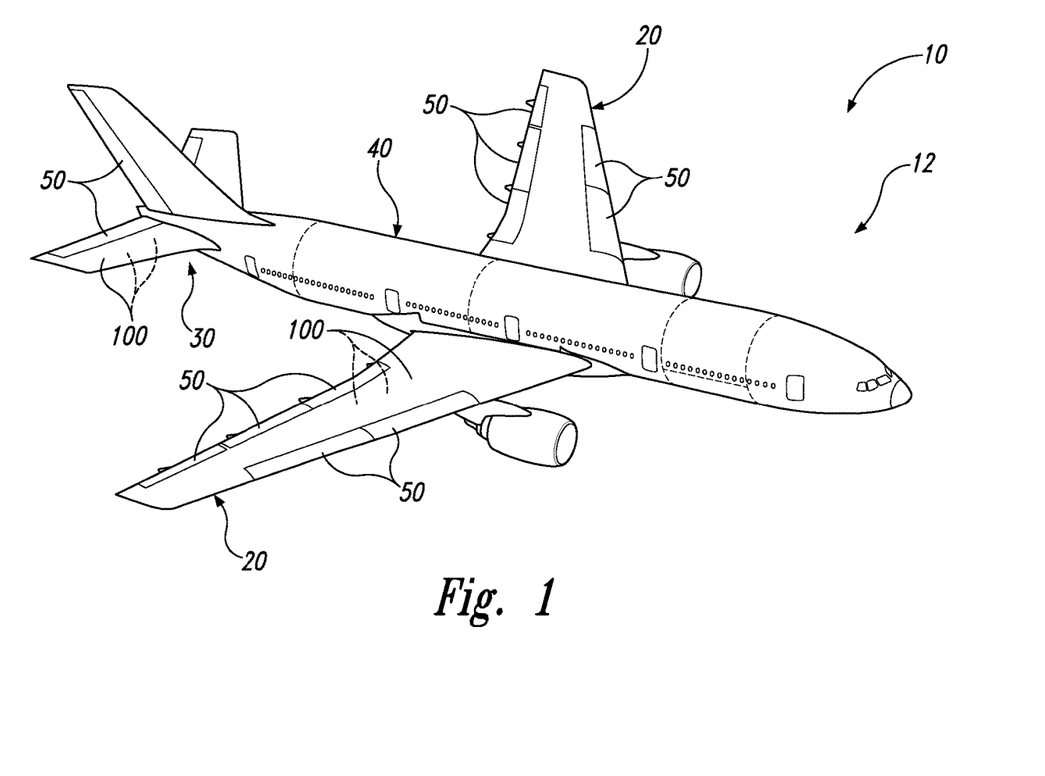
FIG. 1 is a schematic representation of an aircraft that may include and/or utilize actuator assemblies, according to the present disclosure.
Figure 2:
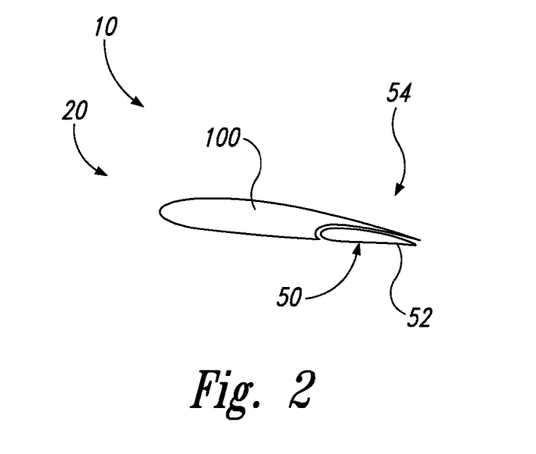
FIG. 2 is a schematic side view of a control surface of an aircraft in a retracted configuration.
Figure 3:
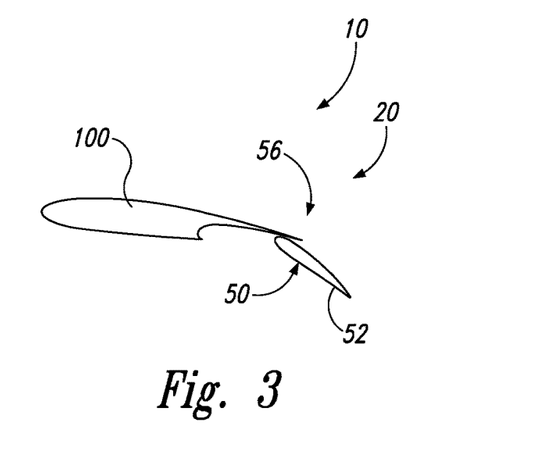
FIG. 3 is a schematic side view of the control surface of FIG. 2 in an extended configuration.

FIG. 1 is a schematic representation of an aircraft 10 that may include and/or utilize actuator assemblies 100, according to the present disclosure. Aircraft 10 include wings 20 and a tail 30 that are attached to a fuselage 40 to form and/or define an airframe 12. Wings 20 and tail 30 include a plurality of control surfaces 50. Control surfaces 50 are adapted, configured, sized, shaped, and/or designed to be selectively actuated between a retracted configuration 54, as illustrated in FIG. 2, and an extended configuration 56, as illustrated in FIG. 3. Actuation of control surfaces 50 changes one or more aerodynamic characteristics of aircraft 10 in any suitable and/or desired manner. Actuation of control surfaces 50 may be facilitated, controlled, and/or regulated by one or more actuator assemblies 100, examples of which are disclosed herein. As an example, each control surface 50 may be actuated by one or more actuator assemblies 100. In a specific embodiment, first and second actuator assemblies 100, which may be spaced apart and/or distinct from one another, may be operatively attached, or pivotally coupled, to a single control surface 50 and/or may be configured to cooperatively transition the control surface between the retracted and extended configurations.

Actuator assemblies 100 may be adapted, configured, designed, sized, and/or constructed to move control surfaces 50 through, or throughout, a control surface range-of-motion. As an example, actuator assemblies 100 may be configured to move control surfaces 50 between retracted configuration 54, as illustrated in FIG. 2, and extended configuration 56, as illustrated in FIG. 3. In this example, the control surface range-of-motion may be defined between retracted configuration 54, or a fully retracted configuration 54, and extended configuration 56, or a fully extended configuration 56.

Control surface 50 may include and/or be any suitable control surface for an aircraft. As an example, and as illustrated in FIGS. 2-3, control surface 50 may include and/or be a flap 52. Flap 52 also may be referred to herein as and/or may be a Fowler flap 52. Additional examples of control surface 50 include one or more of a stabilizer, an elevator, a rudder, a spoiler, a flap, a slat, and/or an aileron of the aircraft.

Figure 4:
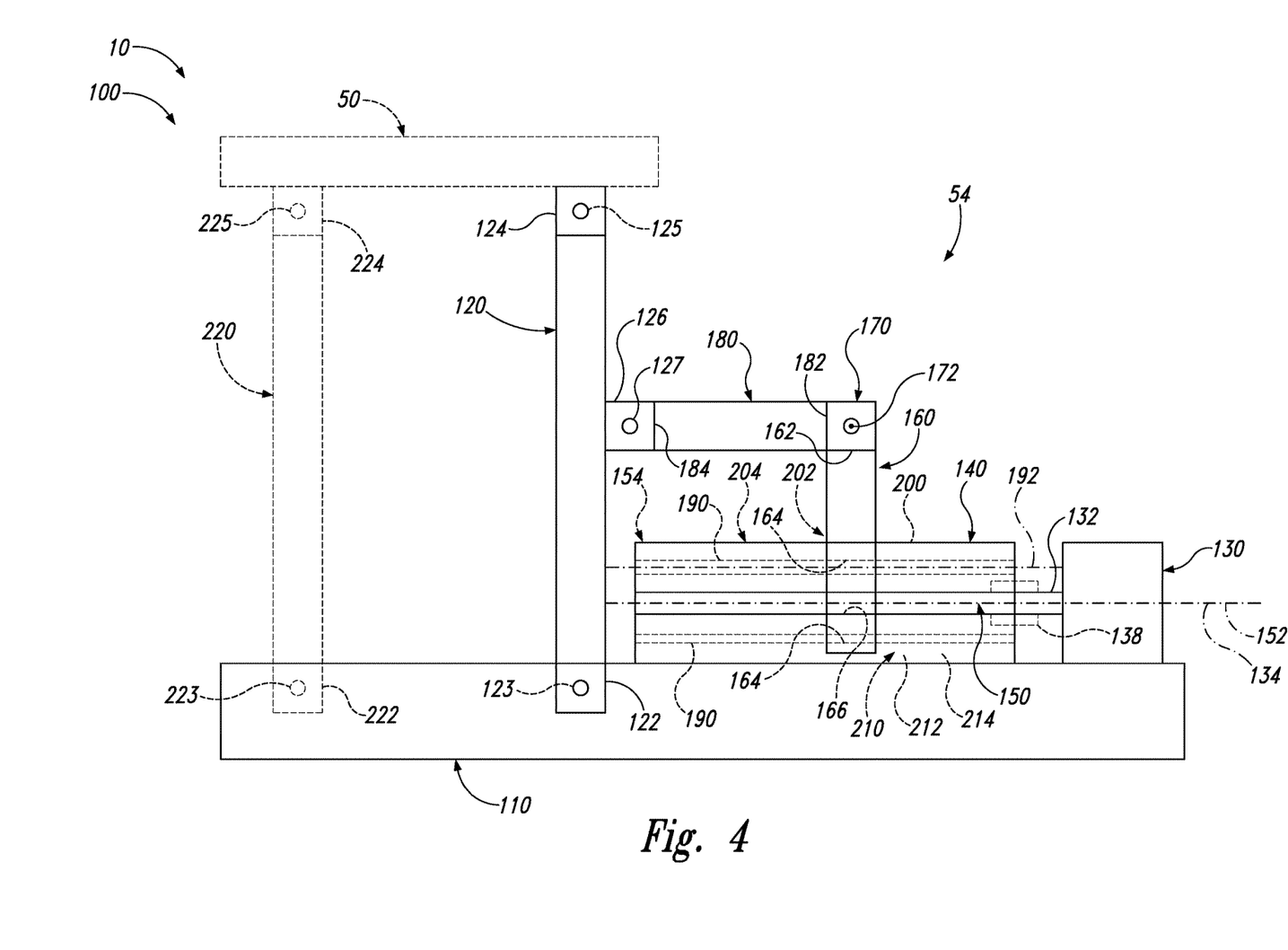
FIG. 4 is a schematic illustration of examples of actuator assemblies, according to the present disclosure, in a retracted configuration.
Figure 5:
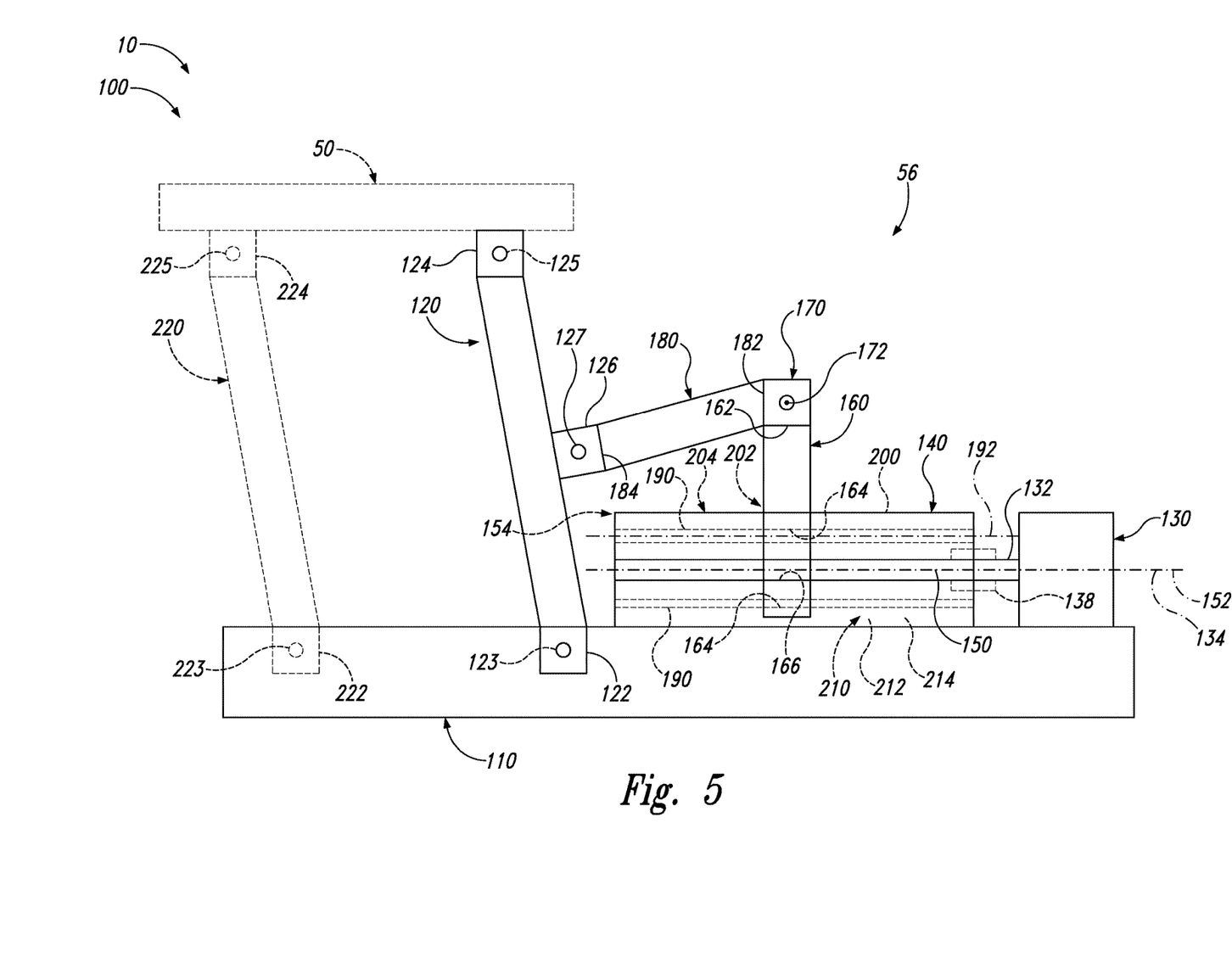
FIG. 5 is a schematic illustration of the actuator assemblies of FIG. 4 in an extended configuration.
Figure 6:
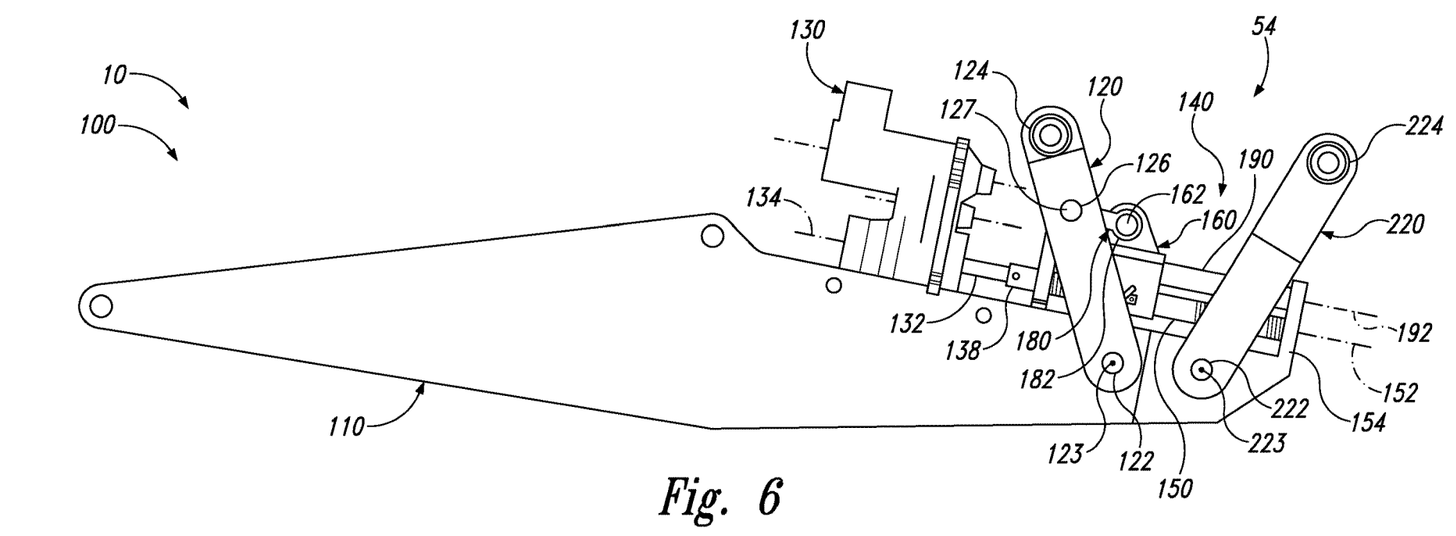
FIG. 6 is a less schematic side view illustrating an example of an actuator assembly, according to the present disclosure, in a retracted configuration.
Figure 7:
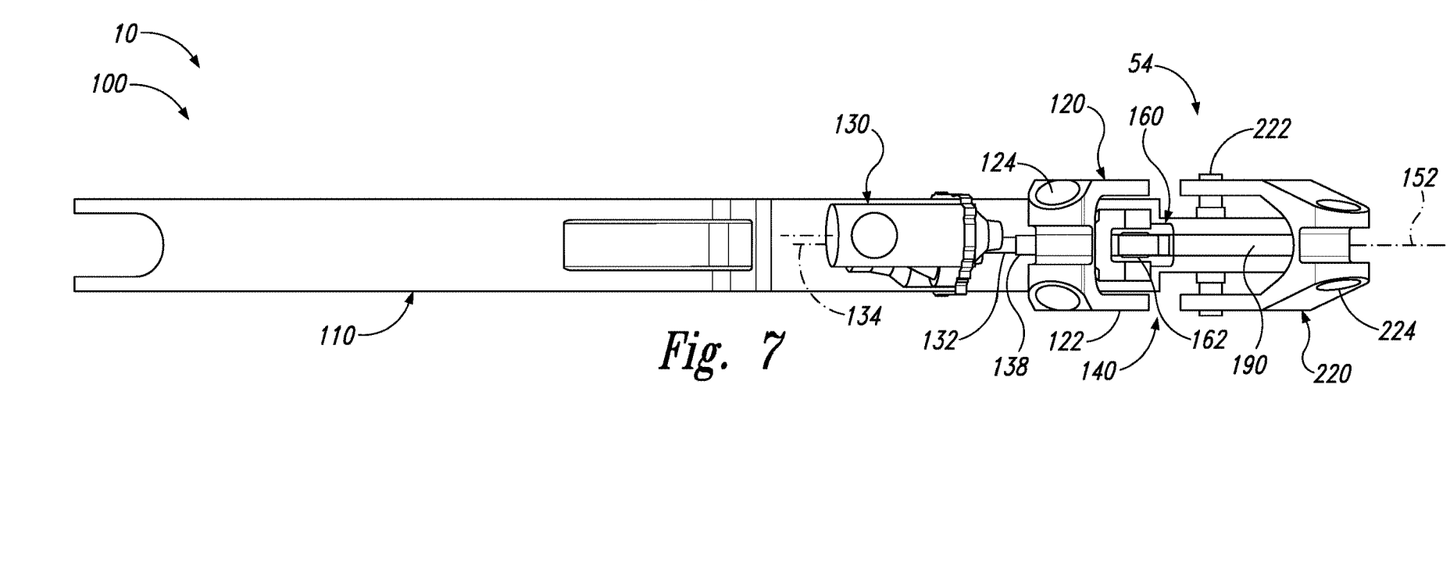
FIG. 7 is a top view of the actuator assembly of FIG. 6.
Figure 8:
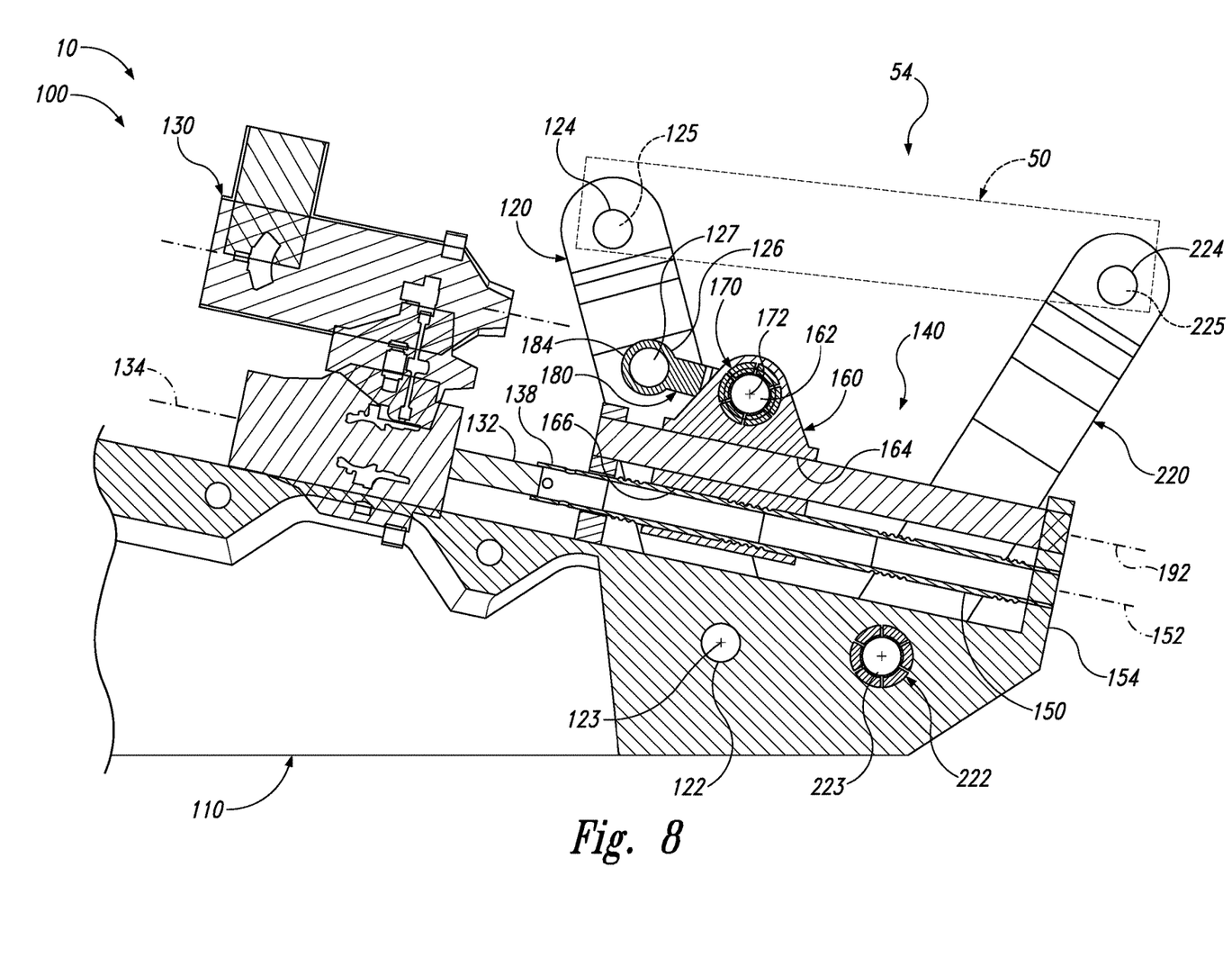
FIG. 8 is a cross-sectional view of a portion of the actuator assembly of FIGS. 6-7.
Figure 9:
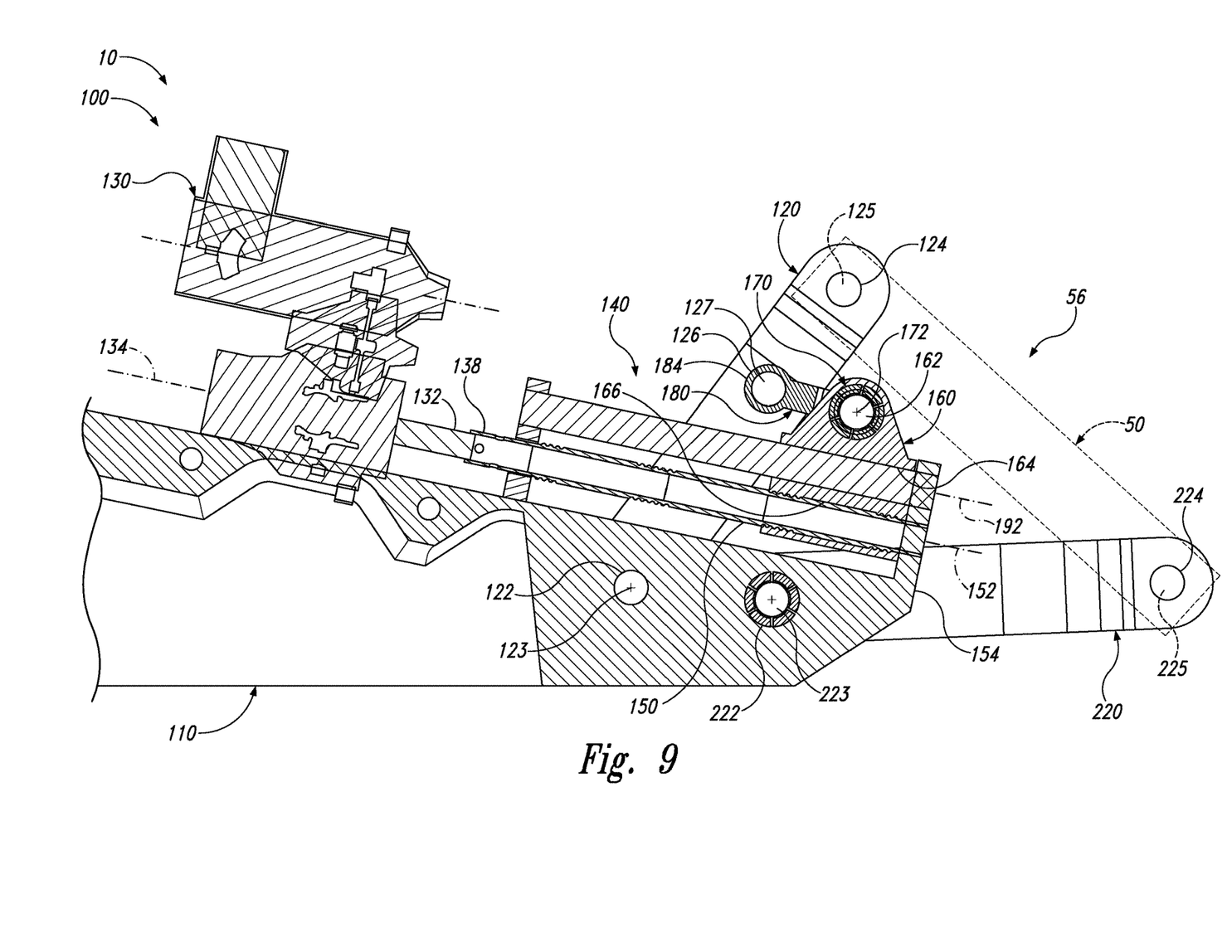
FIG. 9 is a cross-sectional view of a portion of the actuator assembly of FIGS. 6-7 but illustrating the actuator assembly in an extend configuration.
Figure 10:
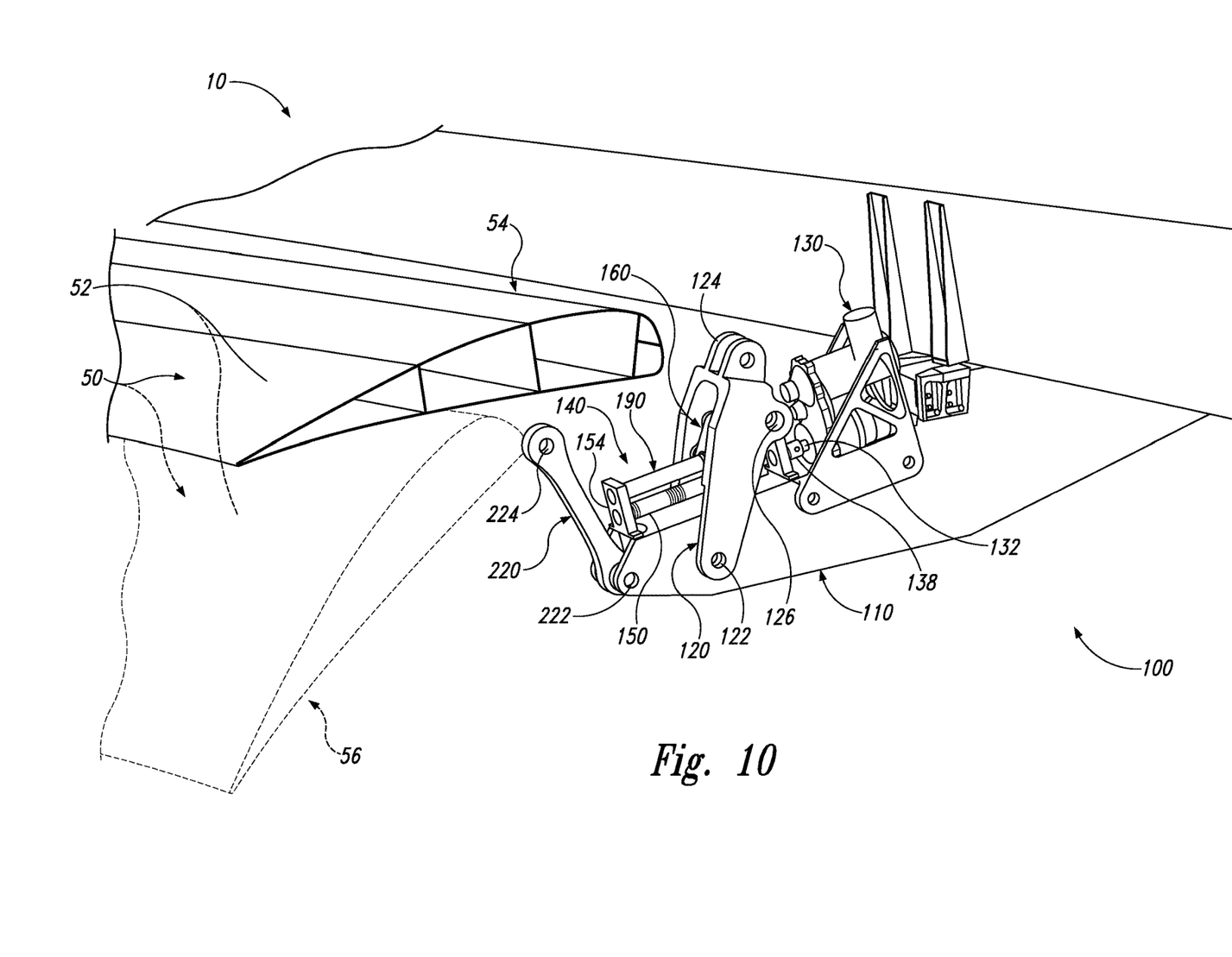
FIG. 10 is an isometric view of an actuator assembly being utilized to actuate a flap of an aircraft.

FIGS. 4-5 are schematic illustrations of examples of actuator assemblies 100, according to the present disclosure. FIG. 4 illustrates actuator assemblies 100 in a retracted configuration 54, while FIG. 5 illustrates actuator assemblies 100 in an extended configuration 56. FIGS. 6-9 are less schematic view of an actuator assembly 100 according to the present disclosure. FIG. 6 illustrates a side view of actuator assembly 100 in retracted configuration 54, while FIG. 7 illustrates a top view of the actuator assembly of FIG. 6. FIG. 8 is a cross-sectional view of a portion of actuator assembly 100 of FIGS. 6-7, while FIG. 9 is a cross-sectional view of the portion of actuator assembly 100 of FIGS. 6-7 but illustrating the actuator assembly in extend configuration 56. FIG. 10 is an isometric view of an actuator assembly 100 being utilized to actuate a flap 52 of an aircraft 10.

FIGS. 6-10 may be more detailed and/or less schematic views of actuator assemblies 100 of FIGS. 4-5 and/or of actuator assemblies 100 that may be utilized in aircraft 10 of FIGS. 1-3. Additionally or alternatively, FIGS. 4-5 may be less detailed and/or more schematic views of actuator assemblies 100 of FIGS. 6-10 and/or of actuator assemblies 100 that may be utilized in aircraft 10 of FIGS. 1-3. As such, any of the structures, functions, and/or features that are disclosed herein with reference to actuator assemblies 100 of FIGS. 4-5 may be included in and/or utilized with actuator assemblies 100 of FIGS. 6-10 and/or aircraft 10 of FIGS. 1-3 without departing from the scope of the present disclosure. Similarly, any of the structures, functions, and/or features that are disclosed herein with reference to actuator assemblies 100 of FIGS. 6-10 may be included in and/or utilized with actuator assemblies 100 of FIGS. 4-5 and/or aircraft 10 of FIGS. 1-3 without departing from the scope of the present disclosure.

As illustrated collectively by FIGS. 4-10, actuator assemblies 100 according to the present disclosure include a base structure 110 and an actuated arm 120. Actuated arm 120 includes a base mount 122, a surface mount 124, and a linkage mount 126. Base mount 122 is operatively, rotationally, and/or pivotally coupled to base structure 110, such as via a base mount pivotal coupling 123. Surface mount 124 is, or is configured to be, operatively, rotationally, and/or pivotally coupled to control surface 50, such as via a surface mount pivotal coupling 125. Actuator assemblies 100 also include a drive assembly 130 that includes an output shaft 132. Drive assembly 130 is operatively attached, or mounted, to base structure 110 and output shaft 132 may be configured to be selectively, such as relative to a remainder of drive assembly 130, about an output shaft axis of rotation 134.

Actuator assemblies 100 also include a linear actuator 140. Linear actuator 140 includes an actuator shaft 150 and an actuated body 160. Actuator shaft 150 is coupled to, and configured to rotate with, output shaft 132. This rotation may be about an actuator shaft axis of rotation 152. Actuated body 160 is coupled to actuator shaft 150 and includes a joint mount 162. Actuator shaft 150 and actuated body 160 are configured such that the actuated body operatively translates along a length of the actuator shaft responsive to rotation of the actuator shaft about the actuator shaft axis of rotation.

Actuator assemblies 100 further include a joint 170 and a linkage 180. Joint 170 is operatively attached to joint mount 162 of actuated body 160. In addition, joint 170 defines a plurality of joint pivot axes 172 that all are spaced apart, or distinct, from actuator shaft rotational axis 152. Linkage 180 includes a body mount 182 and an arm mount 184. Body mount 182 is operatively attached to actuated body 160 via joint 170. Arm mount 184 is operatively, rotationally, and/or pivotally coupled to linkage mount 126 of actuated arm 120, such as via a linkage mount pivotal coupling 127.

During operation of actuator assemblies 100 and/or of aircraft 10 including actuator assemblies 100, drive assembly 130 may be utilized to rotate output shaft 132, such as about output shaft axis of rotation 134. Rotation of output shaft 132 causes actuator shaft 150 also to rotate, such as about actuator shaft axis of rotation 152. Rotation of actuator shaft 150 causes actuated body 160 to operatively translate along the length of the actuator shaft. A direction of this operative translation may be selected via selection of a direction of rotation of output shaft 132 and/or of actuator shaft 150. As an example, rotation of the output shaft and/or of the actuator shaft in a first direction, such as a clockwise direction, may cause operative translation of actuated body 160 along the length of actuator shaft 150 in a first direction. In contrast, rotation of the output shaft and/or of the actuator shaft in a second direction, such as an opposed direction and/or a counterclockwise direction, may cause operative translation of actuated body 160 along the length of actuator shaft 150 in a second direction that is opposed to the first direction.

As illustrated by the transition from FIG. 4 to FIG. 5 and/or by the transition from FIG. 8 to FIG. 9, operative translation of actuated body 160 along the length of actuator shaft 150 causes actuated arm 120 to pivot relative to base structure 110. In the example of FIGS. 4-5 and 8-9, operative translation of actuated body 160 to the left causes actuated arm 120 to pivot, about base mount 122, in a counterclockwise direction. Conversely, operative translation of actuated body 160 to the right causes actuated arm 120 to pivot in a clockwise direction. In the example of FIGS. 8-9, pivoting actuated arm 120 in the clockwise direction causes the actuated arm to move control surface 50 toward and/or to extended configuration 56. In contrast, pivoting actuated arm 120 in the counterclockwise direction causes the actuated arm to move control surface 50 toward and/or to retracted configuration 54. Thus, and as discussed, actuator assembly 100 is configured to move control surface 50 through and/or throughout the control surface range-of-motion. This control surface range-of-motion also is illustrated in FIG. 10, with retracted configuration 54 of flap 52 being illustrated in solid lines and extended configuration 56 of flap 52 being illustrated in dashed lines.

Linear actuators 140 may include and/or be any suitable structure that includes actuator shaft 150 and actuated body 160, that is configured to operatively and/or linearly translate actuated body 160, such as along the length of the actuator shaft, and/or that may be configured to produce and/or generate linear, or at least substantially linear, motion of actuated body 160. Examples of linear actuator 140 include a lead screw and nut assembly and/or a ball screw and ball nut assembly.

Actuator shaft 150 may include any suitable structure that may be adapted, configured, designed, and/or constructed to produce and/or generate linear motion of actuated body 160, along the length of the actuator shaft, responsive to rotation of the actuator shaft about the actuator shaft axis of rotation. As examples, actuator shaft 150 may include and/or be a threaded shaft, a lead screw, a ball screw, and/or a roller screw.

It is within the scope of the present disclosure that both ends of actuator shaft 150 may be fixed, or at least substantially fixed, in space, at least relative to base structure 110 and/or relative to drive assembly 130. As an example, an orientation of actuator shaft axis of rotation 152 relative to base structure 110 may be constant, or at least substantially constant, throughout the control surface range-of-motion, as the control surface is moved between the extended configuration and the retracted configuration, and/or as the actuated body operatively translates along the length of the actuator shaft. As another example, a first end of the actuator shaft may be coupled to output shaft 132 and may be fixed in space, relative to base structure 110 by the operative attachment between drive assembly 130 and base structure 110.

As another example, an opposed, or second, end of actuator shaft 150 may be mounted to base structure 110 via a shaft mount 154. Shaft mount 154 may be configured to retain the above-described relative orientation between the actuator shaft and the base structure while, at the same time, permitting the actuator shaft to rotate relative to the base structure. As such, shaft mount 154 also may be referred to herein as a fixed mount 154 and/or as a fixed shaft mount 154. Additionally or alternatively, shaft mount 154 may be referred to herein as retaining a fixed relative orientation between actuator shaft axis of rotation 152 and base structure 110. Examples of shaft mount 154 include any suitable bushing and/or bearing.

As discussed, actuator shaft 150 may be coupled to output shaft 132 of drive assembly 130. This coupling may be accomplished in any suitable manner. As an example, actuator shaft 150 and output shaft 132 may include and/or define a single, or unitary, shaft. Stated another way, the actuator shaft may form a portion of, or be defined by, the output shaft. As another example, actuator shaft 150 may be distinct and/or separate from output shaft 132 and may be coupled to the output shaft via any suitable coupling 138. Coupling 138 may be defined by actuator shaft 150, may be defined by output shaft 132, and/or may be distinct and/or separate from both the actuator shaft and the output shaft. Examples of coupling 138 include a rigid coupling, a direct coupling, a flex beam coupling, and/or a coupling that is configured to maintain actuator shaft axis of rotation 152 collinear, or at least substantially collinear, with output shaft axis of rotation 134. In general, coupling 138 is configured to maintain a constant, at least substantially constant, fixed, and/or at least substantially fixed relative orientation between the actuator shaft axis of rotation and the output shaft axis of rotation. As such, coupling 138 may not include, or may not be, a variable angle joint, such as a constant velocity joint and/or a universal joint.

Actuated body 160 may include any suitable structure that may be adapted, configured, designed, and/or constructed to linearly translate, along the length of actuator shaft 150, responsive to rotation of the actuator shaft about actuator shaft axis of rotation 152. As an example, actuated body 160 may include and/or define a shaft receptacle 166, and the actuator shaft may be received within the shaft receptacle. Examples of the shaft receptacle include a threaded shaft receptacle and/or a helical ball bearing array.

Joint 170 may include any suitable structure that may be adapted, configured, designed, and/or constructed to define the plurality of joint pivot axes that all are spaced apart from the actuator shaft axis of rotation and/or that may be adapted, configured, designed, and/or constructed to permit linkage 180 to pivot, relative to actuated body 160, about the plurality of joint pivot axes. Stated another way, joint 170 may be adapted, configured, designed, and/or constructed to permit limited rotation, or pivoting, of linkage 180 relative to actuated body 160 about the plurality of joint pivot axes and to restrict pivoting of the linkage relative to the actuated body about other pivot axes. Stated yet another way, none of the joint pivot axes intersects and/or is parallel to the actuator shaft axis of rotation.

Figure 11:
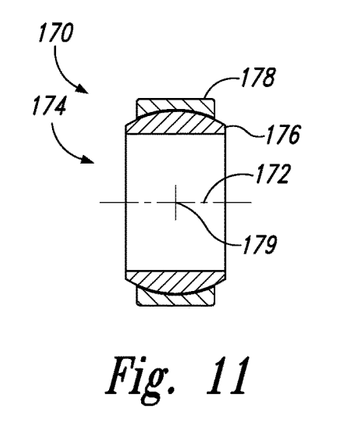
FIG. 11 is a schematic cross-sectional view of a joint that may be utilized with actuator assemblies, according to the present disclosure.
Figure 12:
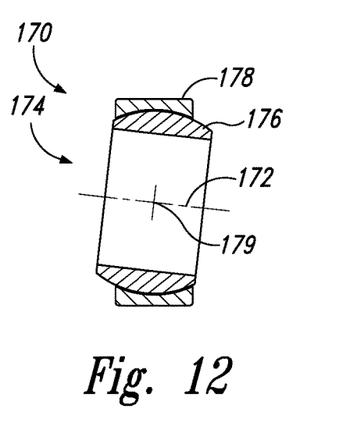
FIG. 12 is a schematic cross-sectional view of a joint that may be utilized with actuator assemblies, according to the present disclosure.
Figure 13:
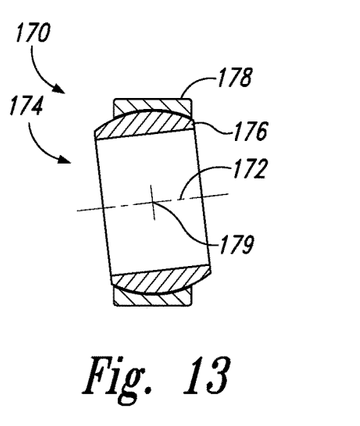
FIG. 13 is a schematic cross-sectional view of a joint that may be utilized with actuator assemblies, according to the present disclosure.

The plurality of joint pivot axes includes more than one joint pivot axis and generally will include an infinite number, or a continuous distribution, of joint pivot axes. As an example, joint 170 may include and/or be a spherical bearing 174, as illustrated in FIGS. 11-13. As illustrated, spherical bearing 174 includes an inner element 176 and an outer element 178 configured to rotate, relative to one another, about a central point 179, in two nominally orthogonal directions, and within a specified angular limit that is defined by the geometry of inner element 176 and outer element 178. In such joints 170, a given orientation of inner element 176 relative to outer element 178 defines a single, or a first, joint pivot axis 172, and inner element 176 and outer element 178 may be rotated relative to one another within a suitable, or permissible, range of rotation, to define others of the plurality of joint pivot axes 172, three of which are collectively illustrated in FIGS. 11-13.

This is in contrast with conventional actuator assemblies that, as discussed, utilize a gimbal joint. As discussed, such a gimbal joint is more bulky and/or complicated when compared to joints 170 utilized herein. In addition, and in conventional actuator assemblies, the gimbal joint defines joint axes of rotation that always are parallel to and/or collinear with a corresponding actuator shaft axis of rotation. As such, joints 170, which are disclosed herein, may be referred to as not including and/or as not being gimbal joints.

Linkage 180 may include any suitable structure that may be adapted, configured, designed, sized, and/or constructed to include and/or define both body mount 182 and arm mount 184, to be operatively attached to the actuated body 160 via joint 170, and/or to be pivotally coupled to linkage mount 126 of actuated arm 120 via arm mount 184 and/or linkage mount pivotal coupling 127. As illustrated in FIGS. 4-9, body mount 182 and arm mount 184 are spaced apart and/or distinct from one another. Examples of linkage 180 include a floating hinge linkage and/or a drop linkage.

As illustrated in dashed lines in FIGS. 4-5 and in solid lines in FIGS. 6-9, actuator assemblies 100 and/or linear actuators 140 thereof also may include one or more guide rods 190. Guide rods 190 may be adapted, configured, designed, sized, and/or constructed to decrease a magnitude of forces applied to actuator shaft 150 that are not directed parallel, or at least substantially parallel, to actuator shaft axis of rotation 152. Stated another way, guide rods 190 may be utilized to at least partially insulate and/or isolate actuator shaft 150 from forces that are not directed parallel, or at least substantially parallel, to actuator shaft axis of rotation 152. Such a configuration may decrease a potential for wear of actuator shaft 150, may increase an operational lifetime of the actuator shaft, may decrease a potential for binding of the actuator shaft, and/or may permit linear actuator 140 to operate more smoothly and/or with less applied power, such as via drive assembly 130, than would be the case were guide rods 190 not present and/or not utilized.

Guide rods 190 may define a guide rod longitudinal axis 192. The guide rod longitudinal axis may be parallel, or at least substantially parallel, to actuator shaft axis of rotation 152. In addition, guide rod longitudinal axis 192 may be spaced apart, or distinct, from actuator shaft axis of rotation 152. When actuator assemblies 100 and/or linear actuators 140 thereof include guide rods 190, actuated body 160 may include and/or define a guide rod receptacle 164, and guide rod 190 may extend within and/or through the guide rod receptacle. Guide rod receptacle 164 may include and/or may be defined by a guide rod bearing.

It is within the scope of the present disclosure that a guide rod 190 may be positioned between base structure 110 and actuator shaft 150. Additionally or alternatively, it is also within the scope of the present disclosure that the actuator shaft may be positioned between the base structure and the guide rod.

As illustrated in dashed lines in FIGS. 4-5, actuator assemblies 100 may include an orientation detection structure 210. Orientation detection structure 210 may be configured to detect, to determine, and/or to quantify a relative orientation between base structure 110 and actuated arm 120, such as to provide information regarding a position of control surface 50 relative to one or more other components of aircraft 10. Orientation detection structure 210 also may be referred to herein as a position detection structure 210.

Orientation detection structure 210 may include and/or be any suitable structure that may be adapted, configured, designed, sized, and/or constructed to detect the relative orientation. As an example, orientation detection structure 210 may include a linear scale 212 and a sensor 214. Linear scale 214 may be operatively attached to one of base structure 110 and actuated body 160, while sensor 214 may be operatively attached to the other of the base structure and the actuated body. Such a configuration may permit detection system 210 to detect a position of actuated body 160 along a length of actuator shaft 150, thereby providing information regarding a location and/or orientation of a control surface 50 and/or of any suitable component of actuator assembly 100.

Drive assembly 130 may include any suitable structure that may be adapted, configured, designed, and/or constructed to be operatively attached to base structure 110 and/or to rotate output shaft 132, such as to provide a motive force for rotation of actuator shaft 150 and/or for translation of actuated body 160 along the length of the actuator shaft. This may include selective and/or reversible rotation of the output shaft. Examples of drive assembly 130 include any suitable drive motor, electric motor, hydraulic motor, stepper motor, solid state motor, and/or shape memory alloy element. As another example, drive assembly 130 may include a transmission assembly that includes and/or is in mechanical communication with output shaft 132. As illustrated, drive assembly 130 and actuator shaft 150 may be oriented, relative to one another, such that output shaft axis of rotation 134 is parallel to and/or coaxial with actuator shaft axis of rotation 152 through and/or throughout the control surface range-of-motion.

Base structure 110 may include any suitable structure that may be pivotally coupled to actuated arm 120, such as via base mount pivotal coupling 123, that may be operatively attached to drive assembly 130, and/or that may form a portion of and/or be utilized in aircraft 10. Examples of base structure 110 include a portion of an aircraft, a portion of a wing of an aircraft, and a portion of an airframe of an aircraft.

Actuated arm 120 may include any suitable structure that may include base mount 122, that may include surface mount 124, and/or that may include linkage mount 126. Additionally or alternatively, actuated arm 120 may include any suitable structure that may be pivotally coupled to base structure 110, such as via base mount pivotal coupling 123, that may be pivotally coupled to control surface 50, such as via surface mount pivotal coupling 125, and/or that may be operatively attached to linkage 180, such as via linkage mount pivotal coupling 127.

Base mount pivotal coupling 123, surface mount pivotal coupling 125, and/or linkage mount pivotal coupling 127 may include any suitable pivotal coupling structure. Examples of suitable pivotal coupling structures include pivotal structures that pivot about a single pivot axis, such as a hinge joint or a floating hinge joint, and pivotal structures that pivot about a plurality of pivot axes, such as a spherical joint.

Within actuated arm 120, and as illustrated, a distance between base mount 122 and surface mount 124 may be greater than a distance between the base mount and linkage mount 126 and/or greater than a distance between the surface mount and the linkage mount. Stated another way, linkage mount 126 may be positioned between, or at least partially between base mount 122 and surface mount 124. It is within the scope of the present disclosure that base mount 122, surface mount 124, and linkage mount 126 may be positioned at vertices of a triangle, as illustrated in FIGS. 4-5. Additionally or alternatively, it is also within the scope of the present disclosure that base mount 122, surface mount 124, and linkage mount 126 may be oriented along a line, as illustrated in FIGS. 6-9.

As illustrated in dashed lines in FIGS. 4-5, actuator assembly 100 and/or linear actuator 140 thereof further may include a shaft cover 200. Shaft cover 200, when present, may be configured to protect actuator shaft 150 and/or actuated body 160, such as from dirt, debris, and/or physical damage. Shaft cover 200 may include a slot 202 that may be parallel, or at least substantially parallel, to actuator shaft axis of rotation 152. As illustrated, at least a portion of actuated body 160 may extend through slot 202, thereby permitting actuated body 160 to interface with and/or to be operatively attached to both actuator shaft 150 and linkage 180.

As also illustrated in dashed lines in FIGS. 4-5, shaft cover 200 further may include a flexible body 204 that may extend at least partially across slot 202. Flexible body 204 may be configured to restrict debris from contacting actuator shaft 150 via slot 202 and/or to restrict debris from entering an enclosed volume that is at least partially defined by shaft cover 200. In addition, flexible body 204 may be configured to permit actuated body 160 to operatively translate along the length of actuator shaft 150 and/or along a corresponding length of slot 202. Examples of flexible body 204 include a plurality of flexible bristles, a foam, and/or a resilient material.

As illustrated in dashed lines in FIGS. 4-5 and in solid lines in FIGS. 6-9, actuator assemblies 100 further may include a passive arm 220. Passive arm 220, when present, may include a passive arm base mount 222 and a passive arm surface mount 224. Passive arm surface mount 224 may be configured to be pivotally coupled to control surface 50, such as via a passive arm surface mount pivotal coupling 225. Passive arm base mount 222 may be pivotally coupled to base structure 110, such as via a passive arm base mount pivotal coupling 223. The pivotal coupling between passive arm base mount 222 and base structure 110 may be such that the passive arm pivots relative to the base structure about a single passive arm pivot axis. Additionally or alternatively, passive arm 220 may pivot, relative to the base structure, about a plurality of passive arm pivot axes. Stated another way, examples of passive arm base mount pivotal coupling 223 and passive arm surface mount pivotal coupling 225 include the pivotal coupling structures that are disclosed herein.

Figure 14:
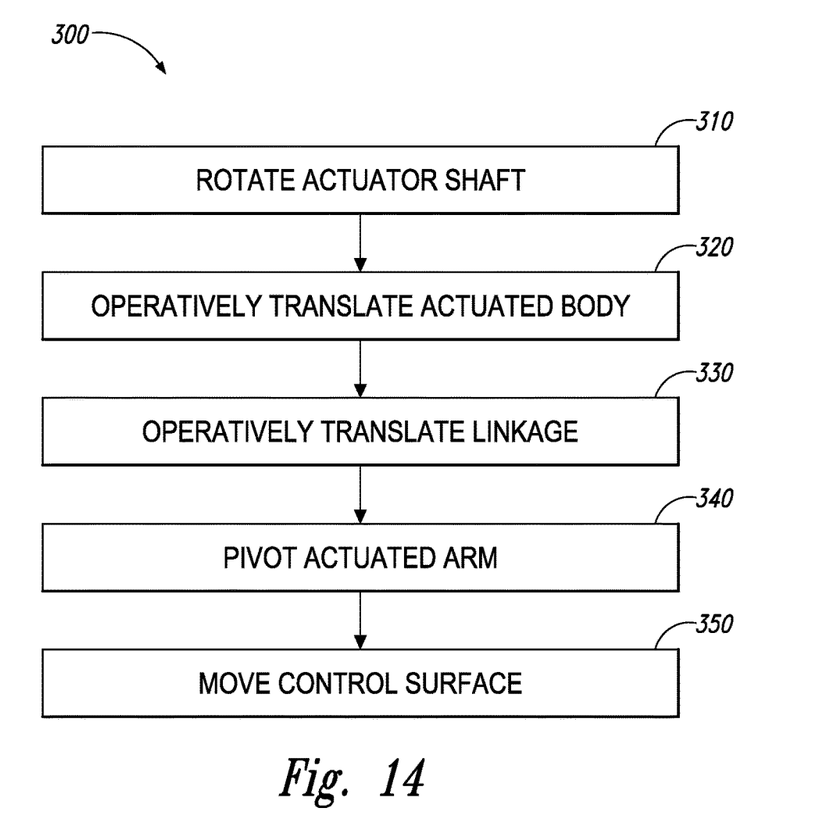
FIG. 14 is a flowchart depicting methods, according to the present disclosure, of moving a control surface of an aircraft through a control surface range-of-motion utilizing an actuator assembly of the aircraft.

FIG. 14 is a flowchart depicting methods 300, according to the present disclosure, of moving a control surface of an aircraft through a control surface range-of-motion utilizing an actuator assembly of the aircraft. While not required of all embodiments, methods 300 may be performed utilizing aircraft 10 of FIGS. 1-3 and/or actuator assemblies 100 of FIGS. 1-10.

Methods 300 include rotating an actuator shaft at 310 and operatively translating an actuated body at 320. Methods 300 also include operatively translating a linkage at 330 and pivoting an actuated arm at 340. Methods 300 further include moving the control surface at 350.

Rotating the actuator shaft at 310 may include rotating an actuator shaft of a linear actuator about an actuator shaft axis of rotation. An example of the linear actuator includes linear actuator 140 of FIGS. 4-10. An example of the actuator shaft includes actuator shaft 150 of FIGS. 4-10. An example of the actuator shaft axis of rotation includes actuator shaft axis of rotation 152 of FIGS. 4-10.

Operatively translating the actuated body at 320 may include operatively translating an actuated body of the linear actuator along a length of the actuator shaft. An example of the actuated body includes actuated body 160 of FIGS. 4-10. As illustrated therein, the actuated body may include a joint mount, and a joint may operatively attach the actuated body to the linkage.

The operatively translating at 320 may be responsive to, or based upon, the rotating at 310. As an example, and as discussed herein, the actuated body and the actuator shaft may be configured, or threaded, such that rotation of the actuator shaft causes translation of the actuated body along the length thereof.

As discussed, the linkage may be operatively attached to the actuated body via the joint. As such, the operatively translating the linkage at 330 may be based upon and/or responsive to the operatively translating at 320. The linkage may include an arm mount that pivotally couples the linkage to the actuated arm. The operatively translating at 330 further may include permitting limited pivotal motion of the linkage relative to the actuated body via a rotary joint. This may include permitting the limited pivotal motion about a plurality of joint pivot axes that are spaced apart and/or distinct from the actuator shaft axis of rotation. An example of the linkage includes linkage 180 of FIGS. 4-10.

As discussed, the actuated arm may be pivotally coupled to the linkage via the arm mount. As such, the pivoting the actuated arm at 340 may be based upon and/or responsive to the operatively translating at 330. The pivoting at 340 may include pivoting the actuated arm about a base mount that pivotally couples the actuated arm to the base structure. The actuated arm also includes a control surface mount that is pivotally coupled to the control surface. An example of the actuated arm includes actuated arm 120 of FIGS. 4-10.

As discussed, the control surface may be pivotally coupled to the actuated arm via the control surface mount. As such, the moving the control surface at 350 may be based upon and/or responsive to the pivoting at 340. The moving at 340 may include moving the control surface through at least a portion of the control surface range-of-motion. Examples of the control surface and the control surface range of motion are discussed herein with reference to control surface 50 of FIGS. 1-10.

Illustrative, non-exclusive examples of inventive subject matter according to the present disclosure are described in the following enumerated paragraphs:

A1. An actuator assembly configured to move a control surface of an aircraft through a control surface range-of-motion, the actuator assembly comprising:

a base structure;

an actuated arm including a base mount pivotally coupled to the base structure, optionally via a base mount pivotal coupling, a surface mount configured to be pivotally coupled to the control surface, such as via a surface mount pivotal coupling, and a linkage mount;

a drive assembly operatively attached to the base structure and including an output shaft;

a linear actuator including:

(i) an actuator shaft coupled to, and configured to rotate with, the output shaft of the drive assembly about an actuator shaft axis of rotation; and (ii) an actuated body coupled to the actuator shaft and including a joint mount, wherein the actuator shaft and the actuated body are configured such that the actuated body operatively translates linearly along a length of the actuator shaft responsive to rotation of the actuator shaft about the actuator shaft axis of rotation;

a joint operatively attached to the joint mount, wherein the joint defines a plurality of joint pivot axes that all are spaced apart from the actuator shaft axis of rotation; and a linkage including a body mount and an arm mount, wherein the body mount is operatively attached to the actuated body via the joint, wherein the arm mount is pivotally coupled to the linkage mount of the actuated arm, optionally via a linkage mount pivotal coupling, and further wherein operative translation of the actuated body along the length of the actuator shaft pivots the actuated arm relative to the base structure about the base mount to move the control surface through the control surface range-of-motion.

A2. The actuator assembly of paragraph A1, wherein the base structure includes at least one of:
(i) a portion of an aircraft;
(ii) a portion of a wing of the aircraft; and
(iii) a portion of an airframe of the aircraft.

A3. The actuator assembly of any of paragraphs A1-A2, wherein, within the actuated arm, a distance between the base mount and the surface mount is at least one of:
(i) greater than a distance between the base mount and the linkage mount; and
(ii) greater than a distance between the surface mount and the linkage mount.

A4. The actuator assembly of any of paragraphs A1-A3, wherein, within the actuated arm, the linkage mount is positioned at least partially between the base mount and the surface mount.

A5. The actuator assembly of any of paragraphs A1-A4, wherein, within the actuated arm, the linkage mount, the base mount, and the surface mount are positioned at vertices of a triangle.

A6. The actuator assembly of any of paragraphs A1-A5, wherein the drive assembly is configured to provide a motive force for selective and reversible rotation of the output shaft about an output shaft axis of rotation.

A7. The actuator assembly of paragraph A6, wherein the drive assembly includes at least one of:
(i) a drive motor configured to generate the motive force;
(ii) an electric motor configured to generate the motive force;
(iii) a hydraulic motor configured to generate the motive force;
(iv) a stepper motor configured to generate the motive force;
(v) a solid state motor configured to generate the motive force; and
(vi) a shape memory alloy element configured to generate the motive force.

A8. The actuator assembly of any of paragraphs A6-A7, wherein the drive assembly further includes a transmission assembly that includes the output shaft, and further wherein the drive assembly is configured to provide the motive force to the transmission assembly.

A9. The actuator assembly of any of paragraphs A1-A8, wherein at least one of:
(i) an/the output shaft axis of rotation is parallel to the actuator shaft axis of rotation throughout the control surface range-of-motion; and
(ii) the output shaft axis of rotation is coaxial with the actuator shaft axis of rotation.

A10. The actuator assembly of any of paragraphs A1-A9, wherein the linear actuator at least one of includes, is, and instead is at least one of:
(i) a lead screw and nut assembly; and
(ii) a ball screw and ball nut assembly.

A11. The actuator assembly of any of paragraphs A1-A10, wherein a relative orientation of the actuator shaft axis of rotation relative to the base structure is at least one of:
(i) constant, or at least substantially constant, throughout the control surface range-of-motion of the control surface; and
(ii) constant, or at least substantially constant, as the actuated body operatively translates along the length of the actuator shaft.

A12. The actuator assembly of any of paragraphs A1-A11, wherein the actuator shaft includes at least one of:
(i) a threaded shaft;
(ii) a/the lead screw;
(iii) a/the ball screw; and
(iv) a roller screw.

A13. The actuator assembly of any of paragraphs A1-A12, wherein the actuator shaft at least one of:
(i) is distinct from the output shaft; and
(ii) forms a portion of the output shaft.

A14. The actuator assembly of any of paragraphs A1-A13, wherein the actuated body defines a shaft receptacle, and further wherein the actuator shaft is received within the shaft receptacle.

A15. The actuator assembly of paragraph A14, wherein the shaft receptacle includes at least one of:
(i) a threaded shaft receptacle; and
(ii) a helical ball bearing array.

A16. The actuator assembly of any of paragraphs A1-A15, wherein the joint is configured to permit limited pivoting of the linkage, relative to the actuated body, about the plurality of joint pivot axes and to restrict pivoting of the linkage, relative to the actuate body, about other pivot axes.

A17. The actuator assembly of any of paragraphs A1-A16, wherein none of the plurality of joint pivot axes intersects the actuator shaft axis of rotation.

A18. The actuator assembly of any of paragraphs A1-A17, wherein the joint includes, and optionally is defined by, a spherical bearing.

A19. The actuator assembly of any of paragraphs A1-A18, wherein, within the linkage, the body mount is spaced apart from the arm mount.

A20. The actuator assembly of any of paragraphs A1-A19, wherein the linkage includes at least one of:
(i) a floating hinge linkage; and
(ii) a drop linkage.

A21. The actuator assembly of any of paragraphs A1-A20, wherein the linear actuator further includes a guide rod defining a guide rod longitudinal axis, and further wherein:
(i) the actuated body includes a guide rod receptacle;
(ii) the guide rod extends through the guide rod receptacle;
(iii) the guide rod longitudinal axis is parallel, or at least substantially parallel, to the actuator shaft axis of rotation; and
(iv) the guide rod longitudinal axis is spaced apart from the actuator shaft axis of rotation.

A22. The actuator assembly of paragraph A21, wherein at least one of:
(i) the guide rod is positioned between the base structure and the actuator shaft; and
(ii) the actuator shaft is positioned between the base structure and the guide rod.

A23. The actuator assembly of any of paragraphs A1-A22, wherein the actuator assembly further includes a shaft cover configured to protect the actuator shaft.

A24. The actuator assembly of paragraph A23, wherein the shaft cover includes a slot that is parallel, or at least substantially parallel, to the actuator shaft axis of rotation.

A25. The actuator assembly of paragraph A24, wherein at least a portion of the actuated body extends through the slot.

A26. The actuator assembly of any of paragraphs A24-A25, wherein the shaft cover further includes a flexible body that extends at least partially across the slot and is configured to restrict debris from contacting the actuator shaft via the slot.

A27. The actuator assembly of paragraph A26, wherein the flexible body includes at least one of:
 (i) a plurality of flexible bristles;
 (ii) a foam; and
 (iii) a resilient material.

A28. The actuator assembly of any of paragraphs A1-A27, wherein the actuator assembly further includes an orientation detection structure configured to detect a relative orientation between the base structure and the actuated arm.

A29. The actuator assembly of paragraph A28, wherein the orientation detection structure includes a linear scale and a sensor.

A30. The actuator assembly of paragraph 29, wherein the linear scale is operatively attached to one of the base structure and the actuated body, and further wherein the sensor is operatively attached to the other of the base structure and the actuated body.

A31. The actuator assembly of any of paragraphs A1-A30, wherein the actuator assembly further includes a coupling that couples the actuator shaft to the output shaft.

A32. The actuator assembly of paragraph A31, wherein the coupling includes at least one of:
 (i) a rigid coupling;
 (ii) a direct coupling;
 (iii) a flex beam coupling; and
 (iv) a coupling that is configured to maintain the actuator shaft axis of rotation collinear, or at least substantially collinear, with a/the output shaft axis of rotation.

A33. The actuator assembly of any of paragraphs A1-A32, wherein the actuator assembly further includes a passive arm including a passive arm base mount pivotally coupled to the base structure, optionally via a passive arm base mount pivotal coupling, and a passive arm surface mount configured to be pivotally coupled to the control surface, optionally via a passive arm surface mount pivotal coupling.

A34. The actuator assembly of paragraph A33, wherein the passive arm base mount is pivotally coupled to the base structure via a passive arm joint, optionally wherein the passive arm joint includes, or is, a passive arm spherical bearing.

A35. The actuator assembly of any of paragraphs A1-A34, wherein the joint at least one of:
 (i) is not a gimbal joint; and
 (ii) does not include a gimbal joint.

A36. The actuator assembly of any of paragraphs A1-A35, wherein the actuator shaft is not coupled to the output shaft with a universal-joint.

B1. An aircraft including the actuator assembly of any of paragraphs A1-A36.

B2. The aircraft of paragraph B1, wherein the control surface includes, and optionally is, a flap, and optionally a Fowler flap, of the aircraft.

B3. The aircraft of any of paragraphs B1-B2, wherein the actuator assembly is a first actuator assembly, wherein the aircraft further includes a second actuator assembly, wherein the first actuator assembly and the second actuator assembly are spaced apart from one another, and further wherein the control surface is pivotally coupled to both the first actuator assembly and the second actuator assembly.

C1. A method of moving a control surface of an aircraft through a control surface range-of-motion utilizing an actuator assembly of the aircraft, the method comprising:
 rotating an actuator shaft of a linear actuator about an actuator shaft axis of rotation;
 responsive to the rotating the actuator shaft, operatively translating an actuated body of the linear actuator along a length of the actuator shaft, wherein the actuated body includes a joint mount, and further wherein a joint operatively attaches the actuated body to a linkage via the joint mount;
 responsive to the operatively translating the actuated body, operatively translating the linkage, wherein the linkage further includes an arm mount that is pivotally coupled to a linkage mount of an actuated arm, and further wherein the operatively translating the linkage includes permitting limited pivotal motion of the linkage relative to the actuated body, via a rotary joint, about a plurality of joint pivot axes that all are spaced apart from the actuator shaft axis of rotation;
 responsive to the operatively translating the linkage, pivoting the actuated arm about a base mount that pivotally couples the actuated arm to a base structure, wherein the actuated arm further includes a control surface mount that is pivotally coupled to the control surface; and
 responsive to the pivoting the actuated arm, moving the control surface through at least a portion of the control surface range-of-motion.

C2. The method of paragraph C1, wherein the actuator assembly includes the actuator assembly of any of paragraphs A1-A36.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that are recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one A, with no B present (and optionally including entities other than B); in another embodiment, to at least one, optionally including more than one B, with no A present (and optionally including entities other than A); in yet another embodiment, to at least one, optionally including more than one A, and at least one, optionally including more than one B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. An actuator assembly configured to move a control surface of an aircraft through a control surface range-of-motion, the actuator assembly comprising:
   a base structure;
   an actuated arm including a base mount pivotally coupled to the base structure, a surface mount configured to be pivotally coupled to the control surface, and a linkage mount;
   a drive assembly operatively attached to the base structure and including an output shaft;
   a linear actuator including:
      (i) an actuator shaft coupled to, and configured to rotate with, the output shaft of the drive assembly about an actuator shaft axis of rotation; and
      (ii) an actuated body coupled to the actuator shaft and including a joint mount, wherein the actuator shaft and the actuated body are configured such that the actuated body operatively translates linearly along a length of the actuator shaft responsive to rotation of the actuator shaft about the actuator shaft axis of rotation;
   a joint operatively attached to the joint mount, wherein the joint defines a plurality of joint pivot axes that all are spaced apart from the actuator shaft axis of rotation; and
   a linkage including a body mount and an arm mount, wherein the body mount is operatively attached to actuated body via the joint, wherein the arm mount is pivotally coupled to the linkage mount of the actuated arm, and further wherein operative translation of the actuated body along the length of the actuator shaft pivots the actuated arm relative to the base structure about the base mount to move the control surface through the control surface range-of-motion.

2. The actuator assembly of claim 1, wherein the joint is configured to permit limited pivoting of the linkage, relative to the actuated body, about the plurality of joint pivot axes and to restrict pivoting of the linkage, relative to the actuated body, about other pivot axes.

3. The actuator assembly of claim 1, wherein the joint includes a spherical bearing.

4. The actuator assembly of claim 1, wherein the linear actuator includes at least one of:
   (i) a lead screw and nut assembly; and
   (ii) a ball screw and ball nut assembly.

5. The actuator assembly of claim 1, wherein a relative orientation of the actuator shaft axis of rotation relative to the base structure is at least one of:
   (i) at least substantially constant throughout the control surface range-of-motion of the control surface; and
   (ii) at least substantially constant as the actuated body operatively translates along the length of the actuator shaft.

6. The actuator assembly of claim 1, wherein the actuated body defines a shaft receptacle, and further wherein the actuator shaft is received within the shaft receptacle.

7. The actuator assembly of claim 1, wherein the linear actuator further includes a guide rod defining a guide rod longitudinal axis, and further wherein:
   (i) the actuated body includes a guide rod receptacle;
   (ii) the guide rod extends through the guide rod receptacle;
   (iii) the guide rod longitudinal axis is at least substantially parallel to the actuator shaft axis of rotation; and
   (iv) the guide rod longitudinal axis is spaced apart from the actuator shaft axis of rotation.

8. The actuator assembly of claim 7, wherein at least one of:
   (i) the guide rod is positioned between the base structure and the actuator shaft; and
   (ii) the actuator shaft is positioned between the base structure and the guide rod.

9. The actuator assembly of claim 1, wherein the drive assembly is configured to provide a motive force for selective and reversible rotation of the output shaft about an output shaft axis of rotation, and further wherein at least one of:

(i) the output shaft axis of rotation is parallel to the actuator shaft axis of rotation throughout the control surface range-of-motion; and (ii) the output shaft axis of rotation is coaxial with the actuator shaft axis of rotation throughout the control surface range-of-motion.

10. The actuator assembly of claim 1, wherein, within the linkage, the body mount is spaced apart from the arm mount.

11. The actuator assembly of claim 1, wherein the actuator shaft is coupled to the output shaft, wherein the actuator assembly includes a coupling that couples the actuator shaft to the output shaft, and further wherein the coupling includes at least one of:

(i) a rigid coupling;
(ii) a direct coupling;
(iii) a flex beam coupling; and
(iv) a coupling that is configured to maintain the actuator shaft axis of rotation at least substantially collinear with an output shaft axis of rotation of the output shaft.

12. The actuator assembly of claim 1, wherein the actuator assembly further includes a passive arm including a passive arm base mount pivotally coupled to the base structure and a passive arm surface mount configured to be pivotally coupled to the control surface.

13. The actuator assembly of claim 12, wherein the passive arm base mount is pivotally coupled to the base structure via a passive arm joint that includes a passive arm spherical bearing.

14. The actuator assembly of claim 1, wherein the actuator assembly further includes an orientation detection structure configured to detect a relative orientation between the base structure and the actuated arm.

15. The actuator assembly of claim 14, wherein the orientation detection structure includes a linear scale and a sensor, wherein the linear scale is operatively attached to one of the base structure and the actuated body, and further wherein the sensor is operatively attached to the other of the base structure and the actuated body.

16. The actuator assembly of claim 1, wherein the actuator assembly further includes a shaft cover configured to protect the actuator shaft, wherein the shaft cover includes a slot that is at least substantially parallel to the actuator shaft axis of rotation, and further wherein at least a portion of the actuated body extends through the slot.

17. An aircraft including the actuator assembly of claim 1.

18. The aircraft of claim 17, wherein the control surface includes a flap of the aircraft.

19. The aircraft of claim 17, wherein the actuator assembly is a first actuator assembly, wherein the aircraft further includes a second actuator assembly, wherein the first actuator assembly and the second actuator assembly are spaced apart from one another, and further wherein the control surface is pivotally coupled to both the first actuator assembly and the second actuator assembly.

20. A method of moving a control surface of an aircraft through a control surface range-of-motion utilizing an actuator assembly of the aircraft, the method comprising:

rotating an actuator shaft of a linear actuator about an actuator shaft axis of rotation;

responsive to the rotating the actuator shaft, operatively translating an actuated body of the linear actuator along a length of the actuator shaft, wherein the actuated body includes a joint mount, and further wherein a joint operatively attaches the actuated body to a linkage via the joint mount;

responsive to the operatively translating the actuated body, operatively translating the linkage, wherein the linkage further includes an arm mount that is pivotally coupled to a linkage mount of an actuated arm, and further wherein the operatively translating the linkage includes permitting limited pivotal motion of the linkage relative to the actuated body, via a rotary joint, about a plurality of joint pivot axes that all are spaced apart from the actuator shaft axis of rotation;

responsive to the operatively translating the linkage, pivoting the actuated arm about a base mount that pivotally couples the actuated arm to a base structure, wherein the actuated arm further includes a control surface mount that is pivotally coupled to the control surface; and responsive to the pivoting the actuated arm, moving the control surface through at least a portion of the control surface range-of-motion.

\* \* \* \* \*

UNITED STATES PATENT AND TRADEMARK OFFICE
CERTIFICATE OF CORRECTION

PATENT NO.        : 10,611,462 B2
APPLICATION NO.   : 15/681220
DATED             : April 7, 2020
INVENTOR(S)       : Stuart David Young It is certified that error appears in the above-identified patent and that said Letters Patent is hereby corrected as shown below:

In the Claims

Claim 1, Column 16, Lines 16-17, add --the-- after "to" and before "actuated".

Signed and Sealed this
Eighteenth Day of August, 2020

Andrei Iancu
*Director of the United States Patent and Trademark Office*